United States Patent Office 3,206,396
Patented Sept. 14, 1965

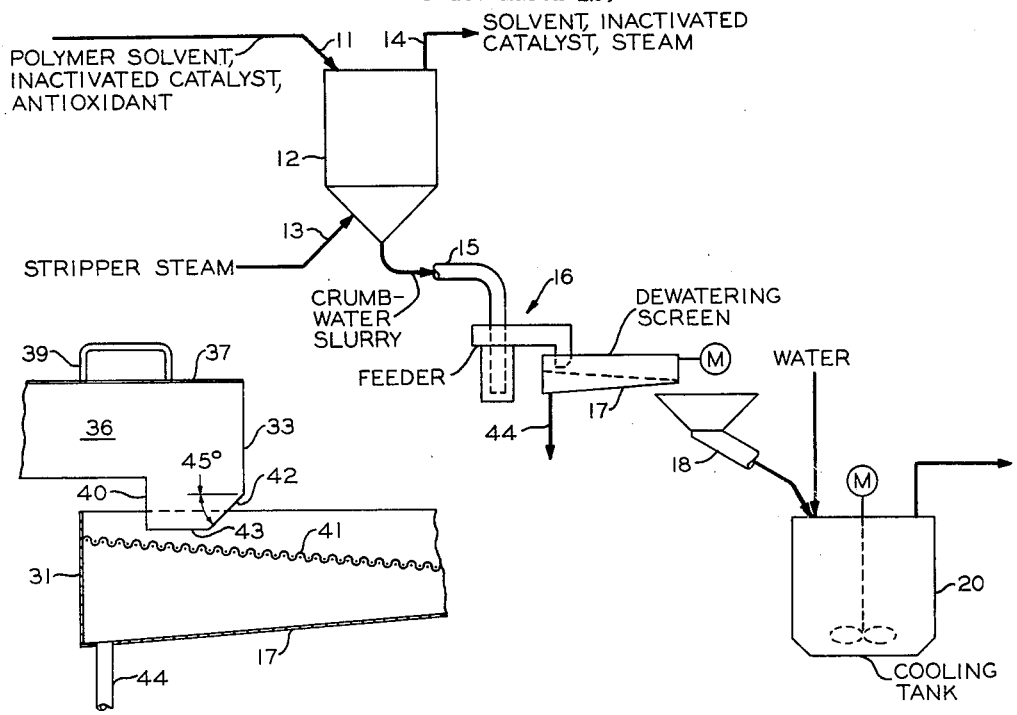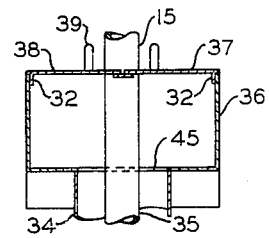

3,206,396
SLURRY FEEDER APPARATUS AND METHOD
Charles L. Davis, Borger, Tex., assignor to Phillips Petroleum Company, a corporation of Delaware
Filed Mar. 12, 1962, Ser. No. 179,110
9 Claims. (Cl. 210—19)

This invention relates to the feeding of a stream of hot material to a process point. In one aspect, it relates to apparatus and a method for feeding a stream of hot liquid containing suspended solid material to a perforate dewatering device without splashing. In another aspect it relates to apparatus and a method for feeding a stream of hot aqueous slurry of rubber crumb to a dewatering screen without splashing hot liquid and without plugging the screen.

Hot aqueous rubber crumb slurry at about 200° F. is conventionally fed to a dewatering screen through a three or four-inch diameter feed pipe at a rate of about 6,000 gallons per hour. For transfer of this volume of slurry through a pipe of the stated size, the transfer pump outlet pressure is usually in the order of 30 to 50 p.s.i.g. (pounds per square inch gauge).

Such a slurry impinging directly against a shaker screen from a conventional transfer pipe very frequently plugs the screen at the point of impact of the slurry with the screen. Upon plugging of such a screen, an operator is required to pass an object over the top of the screen and beneath the open discharge end of the transfer pipe, thereby dislodging the plugging material. As the flow of slurry begins under pump pressure following this unplugging operation serious splashing of this hot slurry occurs. In many instances, an operator carrying on this unplugging operation is splashed with hot slurry at the abovementioned about 200° F. Contact of the skin with such a hot liquid obviously is to be avoided.

An object of this invention is to provide an apparatus and a method for feeding a stream of hot material to a process point without splashing. Another object of this invention is to provide apparatus and a method for feeding a stream of hot liquid containing suspended solid material to a perforate dewatering device without splashing. In yet another object of this invention is to provide apparatus and a method for feeding a stream of a hot aqueous slurry of rubber crumb to a dewatering screen without splashing hot slurry. Other objects and advantages of this invention will be realized upon reading the following description, which taken with the attached drawing, forms a part of this specification.

In the drawing, FIGURE 1 illustrates in diagrammatic form a sequence of apparatus parts for dewatering, filtering and drying crumb rubber from a hot aqueous slurry as produced. FIGURE 2 illustrates in detail the construction of the feeder apparatus of this invention. FIGURE 3 is an elevational view, in part, illustrating the positioning of the outlet end of the feeder apparatus with respect to a dewatering screen. FIGURE 4 is a sectional view of a portion of this apparatus taken on the line 4—4 of FIGURE 2.

Specifically, this invention involves a method including the steps of reducing the rate of flow of feed material by introducing same from a first zone of the higher rate of flow into a second zone of lower rate of flow having an increased cross section and reversing the direction of flow as the material passes from the first zone to the second zone. From this zone of increased cross-section and reduced rate of flow, the material is passed into another zone of still further increased cross-section, thereby reducing the rate of flow still further. From this latter zone, the material to be fed is passed downward a very short distance with its rate of flow being further restricted and then gently added to the surface of the dewatering screen. The apparatus involves a small diameter first pipe surrounded by a closed end second pipe having a larger diameter than the first pipe. This larger diameter pipe has an open upper end and discharges material therefrom into a substantially horizontal conduit of still increased diameter thereby further reducing the rate of flow of material. The material then leaves the launder and flows downward through still another conduit, the discharge end of which is partially covered thereby further restricting the rate of flow. This further restricted rate of flow material is then added over a large section of the width of the dewatering screen.

On reference to the drawing, a mixture of previously polymerized material, solvent, inactivated catalyst and anti-oxidant, is introduced into a vessel 12 by way of a conduit 11. Stripping steam is passed into vessel 12 through a conduit 13 for stripping solvent and inactivated catalyst from the reaction material. This stripped solvent and inactivated catalyst leave vessel 12 by way of a conduit 14 for recovery of materials or for such disposal, as desired. Upon removing of the solvent by steam stripping the polymer coagulates into the form of a rubber crumb and issues from this stripping vessel as the crumb-water slurry at a temperature of about 200° F. or a few degrees higher, through a conduit 15. In some prior art operations for dewatering such a crumb-water slurry, conduit 15 discharges directly on to the surface of a dewatering screen 17. Water separated in screen 17 passes therefrom by way of a conduit 44 for such disposal as desired while the separated crumb passes over the end of the screen and is passed through a conduit 18 to a cooling tank 20. The purpose of this cooling tank 20 and subsequent operations as regards further dewatering of the crumb, expelling moisture from the crumb and drying the crumb after expelling the major portion of the moisture, are all fully described in the copending application of Charles L. Davis, Serial No. 161,150, filed December 21, 1961.

As mentioned hereinbefore, a prior art operation of the dewatering screen 17 involves passing of the crumb-water slurry from conduit 15 and introducing the slurry from the open end of conduit 15 directly to the surface of the screen of the dewatering screen 17. It is obvious that plugging of the screen frequently occurs at the point of mass impingement of the slurry. Thus, in order to avoid plugging of this screen at the outlet of conduit 15, I provide a feeder device 16 which gently adds the slurry over an extended area of the surface of the screen at the relatively low velocity so that the slurry does not plug the openings of the screen.

In FIGURES 2 and 3 is illustrated the detail of the feeder 16. This feeder comprises a vertically positioned conduit 15 which has an open lower outlet end 46 for discharge of the feed material into the closed end of conduit or leg 34. The upper end of leg or conduit 34 opens into a horizontal housing 36 which is actually a launder of substantial width for further reducing the velocity of liquid entering this launder. At the discharge end of launder 36 is provided a down-spout 49 very short in length. At the lower end of end plate 33 is positioned a plate 42 at about a 45° angle from the horizontal. This plate 42 further restricts velocity of the slurry flowing from launder 36 and allows the slurry merely to fall substantially downward through open end 43 directly onto the upper surface of screen 41. In actual practice, the slurry is dropped onto the upper surface of screen 41 across a large portion of its width. Covering the top of the launder 36 are a pair of lids 37 and 38. These lids are constructed as illustrated in FIGURE 4 and are provided with downwardly extending lips 32 near the outer edges thereof to prevent leakage of liquid or slurry from within the launder. Handles 39 are provided for lifting these lids from the launder when the interior thereof is to be inspected. The top open end of leg 34 is identified in FIGURE 4 by reference numeral 45. The vertical portion of conduit 15 within leg 34 is identified in FIGURE 2 by reference numeral 35.

In one instance, a feeder as illustrated in the drawing was constructed of a three-inch I.D. feed pipe 35 positioned along the axis of a twelve-inch diameter pipe 34. The height of the side walls of launder 36 were five inches and the curved end of the launder was the arc of a circle of eleven inch radius. The width of the launder was 22 inches and its overall length was 30 inches. The distance from the center line of vertical conduit 35 to the curved end of the launder was 7⅝ inches while the distance from the center line of conduit 35 to the discharge end of the launder was 22⅜ inches. The discharge end of downspout 40 was 2 inches below the floor of the launder. The downspout 40 extended about 2 inches on the downstream side of the endplate 31 of shaker 17, as illustrated in FIGURE 3. The handles 39 were about two inches in height and 5 inches in length. The shortest distance from plate 40 to the lower edge of end plate 33 was 6 inches.

Such a slurry feeder apparatus as illustrated and described herein was employed to feed an aqueous rubber crumb slurry at a temperature of about 200° F. containing 5.7 percent by weight of crumb rubber to a screen 17. The slurry flow rate was about 6000 gallons per hour. The feeder operated very satisfactorily; it distributed the slurry over substantially the full width of screen 41 and without splashing, or plugging of the screen at any point of impact of slurry with the screen.

While certain embodiments of the invention have been described for illustrative purposes, the invention obviously is not limited thereto.

I claim:

1. Apparatus for reducing the linear flow rate of a liquid stream and delivering same at reduced linear flow rate which comprises in combination:
   (1) an upright first conduit open at the bottom end and providing a downward flow path for liquid;
   (2) a second conduit of substantially larger horizontal cross sectional area surrounding the lowermost section of said first conduit and providing an annular upward flow path therewith of substantially larger horizontal cross sectional area than the downward flow path of said first conduit, said second conduit being closed at the bottom and open only at the top;
   (3) a third substantially horizontal conduit of substantially larger vertical cross sectional area than the horizontal cross sectional area of the annular flow path formed by the first and second conduits, said third conduit enclosing only the upper end of said second conduit and a section of said first conduit above said second conduit, said third conduit being closed at one end at a locus outside of and adjacent the upper end of said second conduit and open at the opposite end; and
   (4) a short fourth conduit of at least as large horizontal cross sectional area as the vertical cross sectional area of said third conduit, extending downwardly from the open end of said third conduit for delivering fluid at linear flow rate substantially lower than the linear flow rate in said first conduit, said fourth conduit being open at the lower end to downward flow.

2. The apparatus of claim 1 wherein said first and second conduits are cylindrical and said third and fourth conduits are of rectangular cross section.

3. The apparatus of claim 2 wherein said third and fourth conduits are of greater horizontal width than the diameter of said second conduit.

4. The apparatus of claim 1 including a generally horizontal receiving trough subjacent the lower end of said fourth conduit and of greater width than the width thereof, for receiving delivered liquid.

5. The apparatus of claim 4 including a shaker screen in said trough sloping slightly away from said fourth conduit to a delivery point, the bottom of said trough sloping slight away from said delivery point and having an outlet for liquid in its lower end.

6. A method for feeding a relatively high linear velocity liquid stream downwardly into an open receptacle with a minimum of splashing which comprises the steps of:
   (1) passing said stream downwardly thru a first enclosed zone liquid-full at said high linear velocity;
   (2) passing said stream directly from the lower end of said first zone upwardly thru a second enclosed zone of substantially larger horizontal cross sectional area, liquid-full at a substantially reduced linear velocity;
   (3) passing said stream directly from the upper end of said second zone laterally therefrom in a stream of substantially increased width and at a substantially lower linear flow rate than in step (2); and
   (4) gravitating the effluent stream directly from step (3) downwardly thru a fourth zone in a stream at least as wide as the stream flowing from step (3) into said receptacle.

7. A method of feeding a liquid stream of substantial linear velocity downwardly into an open receptacle with a minimum of splashing, which comprises the steps of:
   (1) passing said stream downwardly thru a first enclosed zone, liquid-full, at said high linear velocity;
   (2) passing the effluent stream directly from the lower end of said first zone upwardly in a substantially expanded stream, liquid-full, thru a second enclosed zone at substantially reduced linear velocity;
   (3) expanding the effluent stream from step (2) directly into a horizontally flowing stream of substantially increased width in a third zone so as to further reduce the linear flow rate thereof; and
   (4) gravitating the effluent stream from step (3) thru a fourth zone of relatively short height into said receptacle.

8. The process of claim 7 wherein said liquid stream includes particulate solids suspended therein and including the steps of:
   (5) catching said solids on a shaker screen and recovering same therefrom; and
   (6) separately recovering a stream of liquid from said receptacle.

9. The process of claim 8 wherein said stream is an aqueous slurry of rubber crumb.

References Cited by the Examiner

UNITED STATES PATENTS

| 554,598 | 2/96 | Gilmore | 55—176 |
| 2,586,671 | 2/52 | Landis | 55—206 X |

FOREIGN PATENTS

| 669,102 | 7/29 | France. | |

REUBEN FRIEDMAN, *Primary Examiner.*